US010007972B2

(12) United States Patent
Choi et al.

(10) Patent No.: US 10,007,972 B2
(45) Date of Patent: Jun. 26, 2018

(54) IMAGE PROCESSING APPARATUS AND METHOD FOR PERFORMING PREPROCESSING TO OBTAIN IMAGE WITH IMPROVED SHARPNESS

(71) Applicants:HYUNDAI MOTOR COMPANY, Seoul (KR); KIA MOTORS CORPORATION, Seoul (KR); Inha University Research and Business Foundation, Incheon (KR)

(72) Inventors: Jin Wook Choi, Goyang-si (KR); Byung Cheol Song, Seoul (KR); Dong Yoon Choi, Seosan-si (KR); Ji Hoon Choi, Bucheon-si (KR)

(73) Assignees: HYUNDAI MOTOR COMPANY, Seoul (KR); KIA MOTORS CORPORATION, Seoul (KR); INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 2 days.

(21) Appl. No.: 15/331,980

(22) Filed: Oct. 24, 2016

(65) Prior Publication Data

US 2017/0358061 A1 Dec. 14, 2017

(30) Foreign Application Priority Data

Jun. 10, 2016 (KR) .......................... 10-2016-0072497

(51) Int. Cl.
*G06T 5/00* (2006.01)
*G06T 3/40* (2006.01)
(Continued)

(52) U.S. Cl.
CPC ............ *G06T 5/003* (2013.01); *G06T 3/0062* (2013.01); *G06T 3/4053* (2013.01); *G06T 5/20* (2013.01); *G06T 2207/30252* (2013.01)

(58) Field of Classification Search
CPC ..... G06T 3/0018; G06T 3/4053; G06T 5/003; G06T 5/20
See application file for complete search history.

(56) References Cited

U.S. PATENT DOCUMENTS 7,893,985 B1 * 2/2011 Ahiska ................ H04N 5/2259
  348/222.1
8,249,357 B2  8/2012 Yitzhaky et al.
(Continued)

FOREIGN PATENT DOCUMENTS

JP  2007-226791 A  9/2007
JP  2008-123293 A  5/2008
(Continued)

OTHER PUBLICATIONS

Office Action dated Mar. 3, 2017, issued in corresponding Korean Patent Application No. 10-2016-0072497.

*Primary Examiner* — Sean Motsinger
(74) *Attorney, Agent, or Firm* — McDermott Will & Emery LLP

(57) ABSTRACT

An image processing apparatus for transforming a wide-angle image into a narrow-angle image includes a deblurrer performing deblurring on the wide-angle image to generate a deblurred image; a super-resolution (SR) unit performing SR processing on the deblurred image to generate an upscaled transformed image; and a view transformer performing view transformation to obtain the narrow-angle image based on the wide-angle image and the upscaled transformed image.

20 Claims, 8 Drawing Sheets

(51) Int. Cl.
*G06T 5/20* (2006.01)
*G06T 3/00* (2006.01)

(56) References Cited

U.S. PATENT DOCUMENTS

| | | | |
|---|---|---|---|
| 2006/0139376 A1* | 6/2006 | Le Dinh | G06T 3/4084 345/660 |
| 2007/0189630 A1 | 8/2007 | Lei | |
| 2009/0066811 A1 | 3/2009 | Maekawa | |
| 2011/0128138 A1* | 6/2011 | Yamamoto | B60W 30/0956 340/436 |
| 2011/0129167 A1* | 6/2011 | Nojima | G06T 5/003 382/266 |
| 2013/0016918 A1* | 1/2013 | Haribhatt | G06T 5/006 382/275 |
| 2014/0023291 A1* | 1/2014 | Lin | G06T 5/003 382/279 |
| 2014/0125825 A1* | 5/2014 | Baer | H04N 5/23277 348/208.5 |
| 2014/0193032 A1* | 7/2014 | Zhang | G06T 5/003 382/103 |
| 2014/0341461 A1* | 11/2014 | Taguchi | G06T 3/4007 382/145 |
| 2015/0023611 A1 | 1/2015 | Salvador et al. | |
| 2015/0085151 A1 | 3/2015 | Pekkucuksen et al. | |
| 2015/0093015 A1* | 4/2015 | Liang | G06T 3/4076 382/154 |
| 2015/0296122 A1* | 10/2015 | Kelley | H04N 5/23212 348/349 |
| 2015/0348248 A1* | 12/2015 | Shibata | G06T 5/003 382/260 |
| 2015/0363921 A1 | 12/2015 | Baek et al. | |
| 2016/0063677 A1* | 3/2016 | Deamo | G06T 3/4053 382/199 |
| 2016/0247259 A1 | 8/2016 | Toyoda et al. | |
| 2017/0109873 A1* | 4/2017 | Yang | G06T 5/50 |
| 2017/0352136 A1* | 12/2017 | Uliyar | G06T 5/003 |

FOREIGN PATENT DOCUMENTS

| | | |
|---|---|---|
| JP | 2009-59107 A | 3/2009 |
| JP | 5701467 B1 | 4/2015 |
| KR | 10-1140414 B1 | 5/2012 |
| KR | 10-2014-0116406 A | 10/2014 |
| KR | 10-1471846 B1 | 12/2014 |
| KR | 10-1500552 B1 | 3/2015 |
| KR | 10-2015-0142812 A | 12/2015 |

* cited by examiner

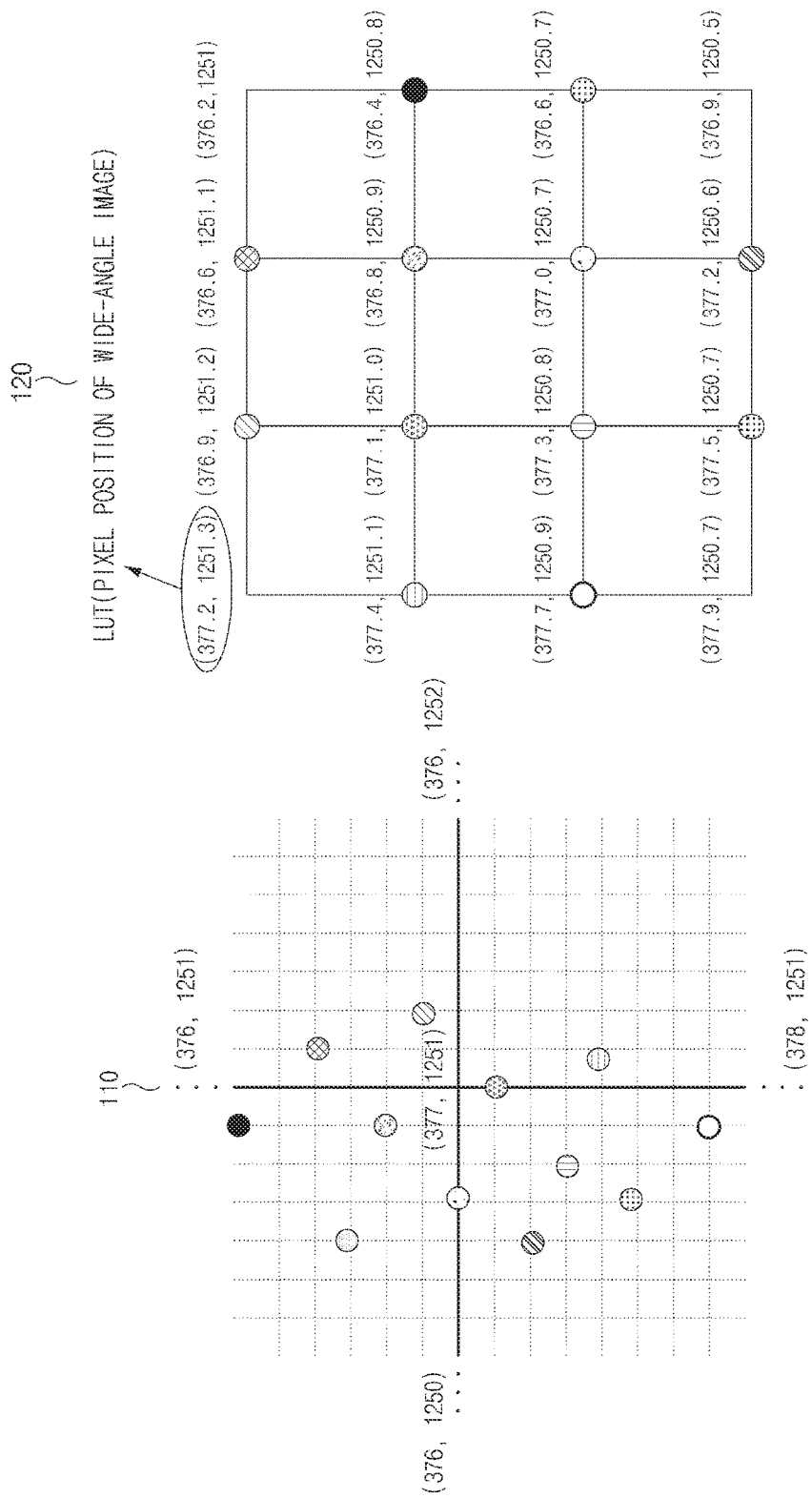

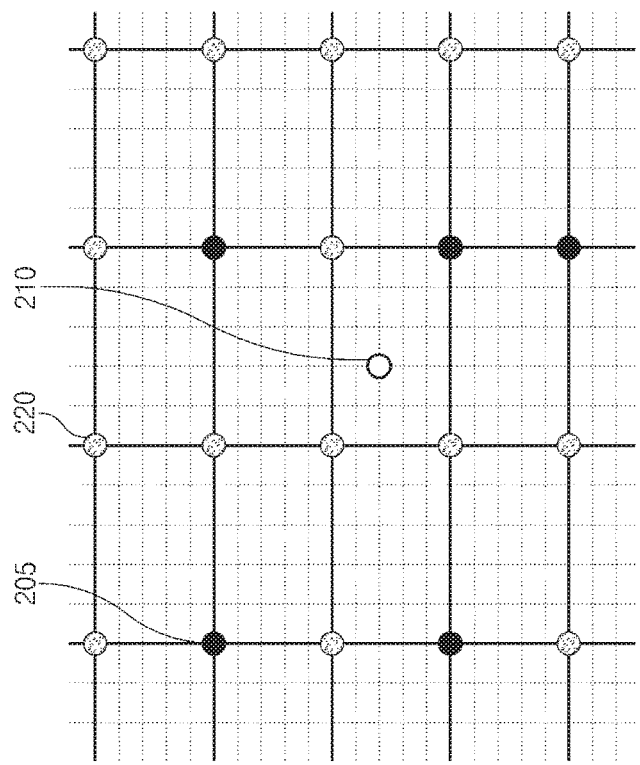
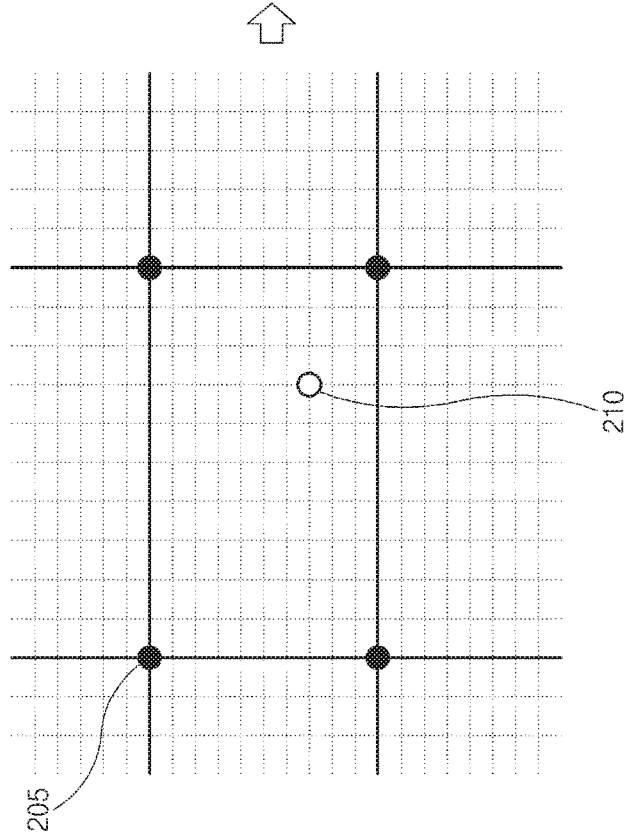
FIG. 2B
FIG. 2A

IMAGE PROCESSING APPARATUS AND METHOD FOR PERFORMING PREPROCESSING TO OBTAIN IMAGE WITH IMPROVED SHARPNESS

CROSS-REFERENCE TO RELATED APPLICATION

This application claims the benefit of priority to Korean Patent Application No. 10-2016-0072497, filed on Jun. 10, 2016, in the Korean Intellectual Property Office, the entirety of which is incorporated herein by reference.

TECHNICAL FIELD

The present disclosure relates to an image processing apparatus and method and, more particularly, to an image processing apparatus and method employing deblur and super-resolution scheme to make an around view monitor (AVM) upscaled image sharp.

BACKGROUND

The smart revolution triggered by smartphones has gradually expanded to affect even automobiles. In an effort to move beyond past conceptions of the automobile, information technology has been employed to increase drivers' convenience with smart vehicles using technologies such as remote starting, voice recognition, automatic driving techniques, and the like. Among various fields, technologies for guaranteeing safety of pedestrians in a vicinity of driving vehicles, as well as drivers, have been actively developed.

When a vehicle is driving, there may be a blind spot in a driver's field of vision when the driver is using side mirrors. In particular, when the driver is parking the vehicle, the presence of such a blind spot may threaten the security of the surroundings of the vehicle including a pedestrian. In order to prevent any collisions, an adjacent object may be recognized using electronic equipment such as a sensor, or the like, or a driver's field of vision may be aided through use of a rear camera. In another method, a top view image visualizing the vehicle from above the vehicle is employed by synthesizing a plurality of wide-angle camera images. When the top view image is synthesized, a process of partially upscaling and transforming the images captured by the wide-angle cameras is performed.

The use of existing linear methods in the process of upscaling the images may cause blurring, jagging artifact, and the like, however, which leads to a degradation in the sharpness of the upscaled images.

SUMMARY

The present disclosure has been made to solve the above-mentioned problems occurring in the prior art while advantages achieved by the prior art are maintained intact.

An aspect of the present disclosure provides an image processing apparatus and method capable of converting an image obtained from a wide-angle camera installed in a vehicle into a sharp around view monitor (AVM) top view image and selectively performing a deblur pre-processing operation on the wide-angle image according to regions to improve shortcomings of an outer portion of the wide-angle image, and capable of enhancing sharpness of a upscaled image by applying a super-resolution technique to improve image quality of a finally synthesized AVM top view image, or the like, to enhance drivers' object recognition ability, thus promoting convenience and safety.

According to an exemplary embodiment of the present disclosure, an image processing apparatus for transforming a wide-angle image into a narrow-angle image includes a deblurrer performing deblurring on the wide-angle image to generate a deblurred image; a super-resolution (SR) unit performing SR processing on the deblurred image to generate an upscaled transformed image; and a view transformer performing view transformation to obtain the narrow-angle image based on the wide-angle image and the upscaled transformed image.

The upscaled transformed image may have sharpness enhanced through preprocessing, and the preprocessing may include the deblurring of the wide-angle image and the SR processing of the deblurred image, and the upscaled transformed image may be used as an input to the view transformation to enhance performance of the view transformation to obtain the narrow-angle image.

The deblurrer may perform a deblur scheme using self-similarity to downscale the input wide-angle image and subsequently search for high frequency information and synthesize the high frequency information with the input wide-angle image to thereby output the wide-angle image with improved sharpness.

The SR unit may obtain the upscaled transformed image with sharp image quality by applying a filter appropriate for a corresponding image according to a form of an image pattern based on an SR scheme using an active local binary pattern (LBP)-based classifier.

The view transformer may estimate pixel values present at non-integer coordinate positions using adjacent pixel values present in integer positions of a wide-angle image referred to from a look-up table (LUT) on the basis of an LUT-based view transformation interpolation scheme.

The deblurrer may include: a downscaling unit generating a downscaled low resolution image using linear interpolation with respect to the input wide-angle image; a first Gaussian low pass filter (LPF) low-pass-filtering the downscaled low resolution image; a second Gaussian LPF performing upscaling and low-pass filtering on the downscaled low resolution image; a first calculator subtracting an output from the first Gaussian LPF from the downscaled low resolution image to generate a high frequency (HF) component image; a block matching unit searching and outputting a high frequency component of the first calculator corresponding to an output image from the second Gaussian LPF using matching of an output image from the first Gaussian LPF and the output image from the second Gaussian LPF; and a second calculator synthesizing the output image from the second Gaussian LPF and the high frequency component from the block matching unit to output a deblurred image.

The deblurrer may deblur a plurality of low resolution images obtained by multi-scaling the input wide-angle image and subsequently obtain a first sharp downscaled image through interpolation on the deblurred images, and generate the deblurred image through interpolation by using the input wide-angle image and the first downscaled image.

The deblurrer may deblur an edge portion excluding a flat region and a texture region of the input wide-angle image.

The SR unit may obtain the upscaled transformed image using a two-dimensional finite impulse response (2D-FIR) filter.

The view transformer may perform view transformation using a Lanczos filter.

According to another exemplary embodiment of the present disclosure, an image processing method for transforming a wide-angle image into a narrow-angle image includes steps of: performing deblurring on the wide-angle image to generate a deblurred image; performing super-resolution (SR) processing on the deblurred image to generate an upscaled transformed image; and performing view transformation to obtain the narrow-angle image based on the wide-angle image and the upscaled transformed image.

The upscaled transformed image with sharpness enhanced through preprocessing including the deblurring on the input wide-angle image and the SR processing on the deblurred image may be used as an input of view transformation to enhance performance in the view transformation to obtain the narrow-angle image.

In the performing of the deblurring, a deblur scheme using self-similarity may be performed to downscale the input wide-angle image and high frequency information may be subsequently searched and synthesized with the input wide-angle image to thereby output the wide-angle image with improved sharpness.

In the generating of the upscaled transformed image, the upscaled transformed image with sharp image quality may be obtained by applying a filter appropriate for a corresponding image according to a form of an image pattern based on an SR scheme using an active local binary pattern (LBP)-based classifier.

In the performing of view transformation, pixel values present at non-integer coordinate positions may be estimated using adjacent pixel values present in integer positions of a wide-angle image referred to from a look-up table (LUT) on the basis of an LUT-based view transformation interpolation scheme.

The performing of the deblurring may include: generating a downscaled low resolution image using linear interpolation with respect to the input wide-angle image; low-pass-filtering, by a first Gaussian low-pass filter (LPF), the downscaled low resolution image; performing upscaling and low-pass filtering, by a second Gaussian LPF, on the downscaled low resolution image; subtracting, by a first calculator, an output from the first Gaussian LPF from the downscaled low resolution image to obtain a high frequency (HF) component; searching and outputting, by a block matching unit, a high frequency component of the first calculator corresponding to an output image from the second Gaussian LPF using matching of an output image from the first Gaussian LPF and the output image from the second Gaussian LPF; and synthesizing the output image from the second Gaussian LPF and the high frequency component from the block matching unit to output a deblurred image.

In the performing of the deblurring, a plurality of low resolution images obtained by multi-scaling the input wide-angle image may be deblurred and a first sharp downscaled image may be obtained through interpolation on the deblurred images, and the deblurred image may be generated through interpolation by using the input wide-angle image and the first downscaled image.

In the performing of the deblurring, an edge portion, excluding a flat region and a texture region of the input wide-angle image, may be deblurred.

In the generating of the upscaled transformed image, the upscaled transformed image may be obtained using a two-dimensional finite impulse response (2D-FIR) filter.

In the performing of the view transformation, the view transformation may be performed using a Lanczos filter.

BRIEF DESCRIPTION OF THE DRAWINGS

The above and other objects, features and advantages of the present disclosure will be more apparent from the following detailed description taken in conjunction with the accompanying drawings.

FIGS. 1A and 1B are views illustrating a mapping relationship between a wide-angle image and a narrow-angle image when a view is transformed according to an exemplary embodiment in the present disclosure.

FIGS. 2A and 2B are views illustrating a super-resolution application method when a view is converted according to an exemplary embodiment in the present disclosure.

DETAILED DESCRIPTION

Figure 3A:
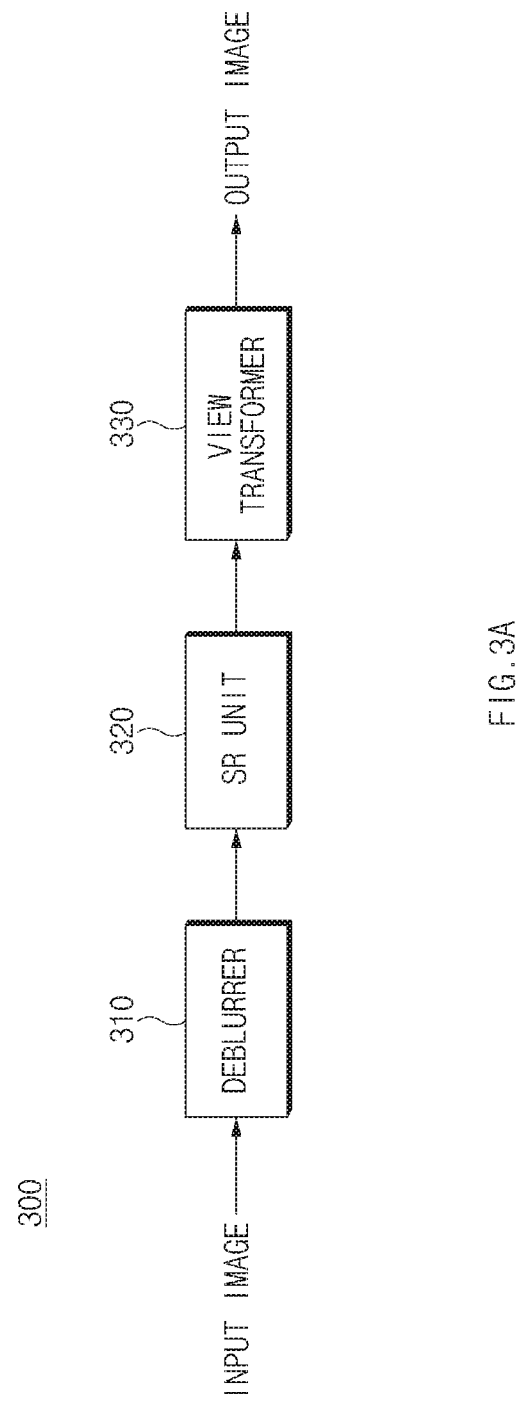
FIG. 3A is a block diagram of an image processing apparatus according to an exemplary embodiment in the present disclosure.

Hereinafter, exemplary embodiments in the present invention will be described in detail with reference to the accompanying drawings. Like reference numerals refer to like elements throughout the drawings. Also, detailed descriptions of relevant known functions and/or configurations are omitted. In the below-disclosed details, descriptions will focus on elements necessary to understand operations according to various embodiments, and the detailed descriptions of elements which unnecessarily obscure the important points of the descriptions will be omitted. Also, in the drawings, some elements may be exaggerated, omitted, or schematically illustrated. The size of each element does not entirely reflect an actual size, and thus, details described herein are not limited by the relative sizes or interval of elements illustrated in each drawing.

When an existing linear method is used in a process of upscaling an image to obtain an around view monitor (AVM) top view image, or the like, a blur phenomenon, a jagging artifact, and the like, may degrade sharpness of the upscaled image. Thus, in order to improve sharpness, a method such as a Laplacian method, unsharp masking, and the like, may be used, but here, a jagging artifact or noise may be amplified.

In order to mitigate this, sharpness of the upscaled image is compensated without an artifact using a super-resolution (SR) scheme to improve image quality of the synthesized top view image. Here, however, in terms of characteristics of a wide-angle image, an outer portion of the image is out of focus, relative to a central portion thereof, and may have low sharpness. Since sharpness of the input image is low, even though the SR scheme is applied thereto, an effect of improving sharpness of the upscaled image is lowered. Thus, when a deblur process is performed as pre-processing on the input wide-angle image, restoration performance of the SR scheme can be enhanced, which eventually leads to an improvement of performance in a view transformation process to maximize image quality of an output image.

Based on this principle, the present disclosure uses the deblur and SR schemes as pre-processing to improve image quality in converting an image obtained from a wide-angle camera installed in a vehicle into an around view monitor (AVM) top-view image, or the like, thereby enhancing a driver's object recognition ability to promote user convenience and safety.

FIGS. 1A and 1B are views illustrating a mapping relationship between a wide-angle image and a narrow-angle image when a view is converted according to an exemplary embodiment in the present disclosure.

Referring to FIGS. 1A and 1B, for example, in order to convert a wide-angle image 110 into a narrow-angle image 120 in generating an AVM top-view image, a look-up table (LUT) produced in advance is used. The LUT indicates which pixel value (image data) of the wide-angle image 110 is to be referred to in order to obtain an (image data) value for each pixel (or coordinates) forming the narrow-angle image 120. However, in order to obtain a pixel value of the narrow-angle image 120, a pixel value positioned in coordinates having a non-integer value (value not an integer) is estimated through interpolation using adjacent pixels present in an integer position of the wide-angle image 110 in the LUT. As interpolation, in general, bilinear interpolation, a very simple linear method, may be used, but since restoration performance thereof is not good, sharpness of the converted narrow-angle image may be slightly lowered.

FIGS. 2A and 2B are views illustrating a super-resolution application method when a view is converted according to an exemplary embodiment in the present disclosure.

Referring to FIG. 2A, a pixel value 210 corresponding to non-integer coordinates of a wide-angle image is determined in a process of generating a narrow-angle image from the wide-angle image through a view transformation process, for example. In order to determine the pixel value 210 of the non-integer coordinates, interpolation is performed with reference to pixel values 205 present in peripheral integer coordinates. Thus, when a space between actually existing pixels (reference pixels) is narrowed, performance of interpolation may be enhanced. Thus, when the reference pixel vales 220 obtained through the SR scheme of upscaling an image while effectively restoring sharpness thereof is used, a space between pixels required for performing interpolation may be reduced, and thus, performance may be enhanced in the process of view transformation.

FIG. 3A is a block diagram of an image processing apparatus 300 according to an exemplary embodiment in the present disclosure.

Referring to FIG. 3A, the image processing apparatus 300 according to the present exemplary embodiment includes a deblurrer 310, an SR unit 320, and a view transformer 330. The deblurrer 310, the SR unit 320, and the view transformer 330 may be implemented by hardware such as a semiconductor processor, software such as an application program, or a combination thereof.

First, operations of the components of the image processing apparatus 300 according to the present exemplary embodiment will be briefly described.

The deblurrer 310 maximizes performance of an SR process by improving characteristics to increase sharpness in an outer portion of a wide-angle image. In order to resolve a blurring phenomenon (haziness) that occurs in an outer portion out of focus in terms of optical characteristics of a wide-angle image, the deblurrer 310 assumes the outer portion of the input wide-angle image as a blurred image having a blur kernel in a Gaussian form on the basis of blur image modeling, and performs a deblur method using self-similarity characteristics to search for high frequency (HF) information from the downscaled input image and synthesize the searched HF information with the input wide-angle image to output a wide-angle image with improved sharpness. That is, the deblurrer 310 generates a sharp image with low resolution by downscaling the blurred input wide-angle image, separates the HF information, and synthesizes the separated HF information with the blurred input wide-angle image to generate the wide-angle image with improved sharpness.

The SR unit 320 performs SR on the wide-angle image output from the deblurrer 310 to generate an upscaled image as a sharp image without an artifact. During the SR process, when the image is upscaled, a filter appropriate for a corresponding image according to forms of image patterns is applied based on an SR scheme using an active local binary pattern (LBP)-based classifier to obtain an upscaled transformed image with sharp image quality. Since the image is upscaled using SR, a space between integer-position pixels used in interpolation may be reduced in view transformation, thus enhancing performance in the view transformation process.

In order to obtain a narrow-angle image corresponding to the wide-angle image upscaled by the SR unit 320, the view transformer 330 estimates pixel values placed in a non-integer coordinate position using peripheral pixel values present in integer position of the wide-angle image referred to from the LUT on the basis of LUT-based view transformation interpolation.

In this manner, in the present disclosure, when an image obtained from a wide-angle camera installed in a vehicle is converted into a sharp AVM top-view image, deblur and SR schemes are performed as preprocessing to obtain a sharpness-improved upscaled image and the sharpness-improved upscaled image is input in the view transformation process, whereby image quality of the AVM image, or the like, may be finally maximized, and thus, the ability of a driver to recognize objects may be enhanced to promote convenience and safety.

Hereinafter, an operation of the image processing apparatus 300 according to an exemplary embodiment in the present disclosure will be described in more detail with reference to FIG. 3B.

Figure 3B:
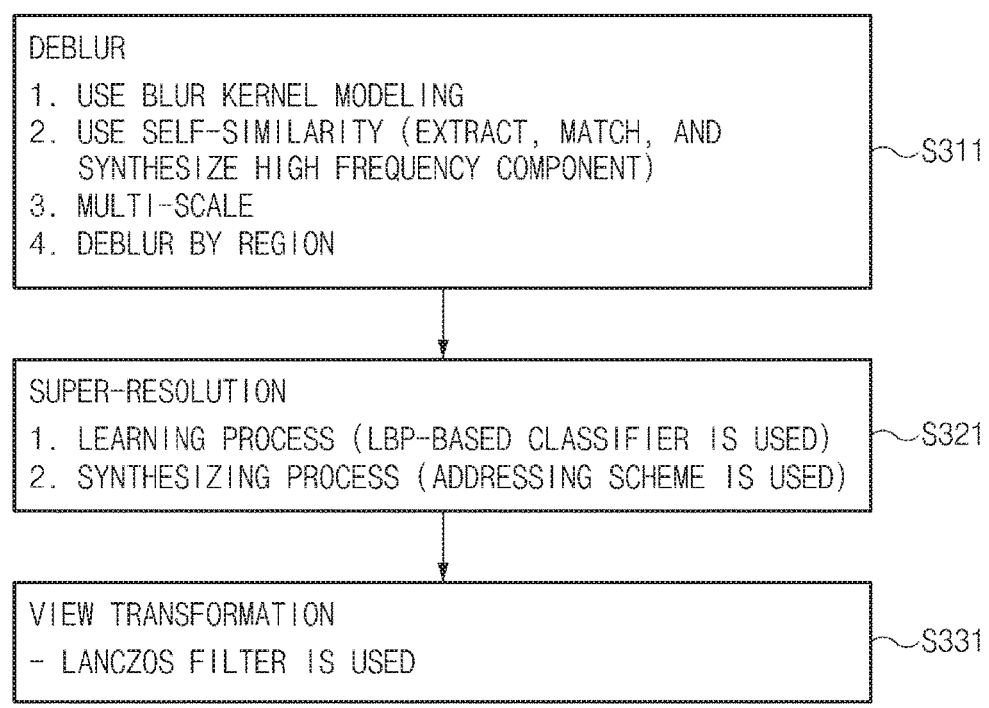
FIG. 3B is a flow chart illustrating an operation of an image processing apparatus according to an exemplary embodiment in the present disclosure.

FIG. 3B is a flow chart illustrating an operation of the image processing apparatus 300 according to an exemplary embodiment in the present disclosure.

First, referring to FIG. 3B, in order to maximize performance of an SR process by preventing degradation of sharpness in an outer portion of a blurred wide-angle image, the deblurrer 310 deblurs the blurred input wide-angle image to generate a wide-angle image with improved sharpness in operation S311. That is, the deblurrer 310 outputs a deblurred image, resolving the blur phenomenon that occurs when the outer portion of the wide-angle image is out of focus in terms of optical characteristics.

<1. Use of Blur Kernel Modeling>

A wide-angle image captured by a wide-angle camera of a vehicle, or the like, has characteristics in that an outer portion thereof is not perfectly focused in terms of optical characteristics, having lower sharpness than that of a central portion of the image. When a blur kernel K regarding an outer portion (pixel value) Y of the wide-angle image (X is coordinates and N is noise) is estimated by applying such characteristics to a function for a blur image modeling such as Equation 1, an outer portion of the wide-angle image may be estimated to have a blur kernel in a Gaussian form.

$$Y = X*K + N \quad \text{[Equation 1]}$$

Figure 4A:
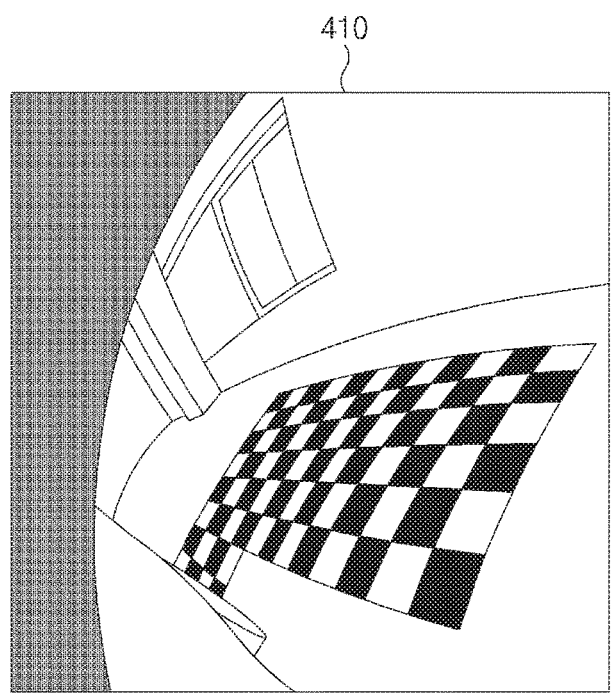
FIGS. 4A and 4B are views illustrating an example of a blur kernel applied to an outer portion of a wide-angle image.
Figure 4B:
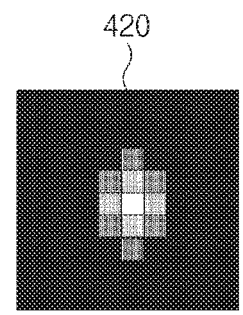

When an image view is transformed, a blur kernel may be estimated regarding the outer portion of the wide-angle image, and according to circumstances, when a transformed region is fixed to an outer portion of a wide-angle image, it may be assumed that a blur kernel of the corresponding region is uniform in a Gaussian form and an estimation process of the blur kernel may be omitted to save an image processing time. FIGS. 4A and 4B are views illustrating a blur kernel 420 (e.g., a weight value in a Gaussian form to be applied to pixels) applied to an outer portion of a wide-angle image denoted by reference numeral 410.

In this manner, the deblurrer 310 assumes the outer portion of the input wide-angle image as a blurred image having a blur kernel in a Gaussian form on the basis of blur image modeling, and performs a deblur method using self-similarity characteristics to search for high frequency (HF) information from the downscaled input image and synthesize the searched HF information with the input wide-angle image to output a wide-angle image with improved sharpness. That is, the deblurrer 310 generates a sharp image with low resolution by downscaling the blurred input wide-angle image, separates the HF information, and synthesizes the separated HF information with the blurred input wide-angle image to generate the wide-angle image with improved sharpness.

In other words, the same natural image obtained by capturing the same scene with different resolutions has self-similarity characteristics that image characteristics such as an edge, or the like, are partially similar. Also, an image blurred with a Gaussian kernel may be an image of a low frequency band generally without a high frequency component. However, when a blurred input wide-angle image is downscaled, an image having high sharpness in which a high frequency component is present although resolution thereof is low is generated. Thus, in order to improve the sharpness of a blurred input wide-angle image on the basis of the characteristics, in the present disclosure, an input image is downscaled to obtain an image with high sharpness and a high frequency component is extracted and synthesized with the input image, whereby the high frequency component is eventually recovered to output an image with improved sharpness.

<2. Use of Self-Similarity Characteristics>

A deblur scheme using self-similarity characteristics will be described with reference to an exemplary embodiment shown in FIG. 5.

Figure 5:
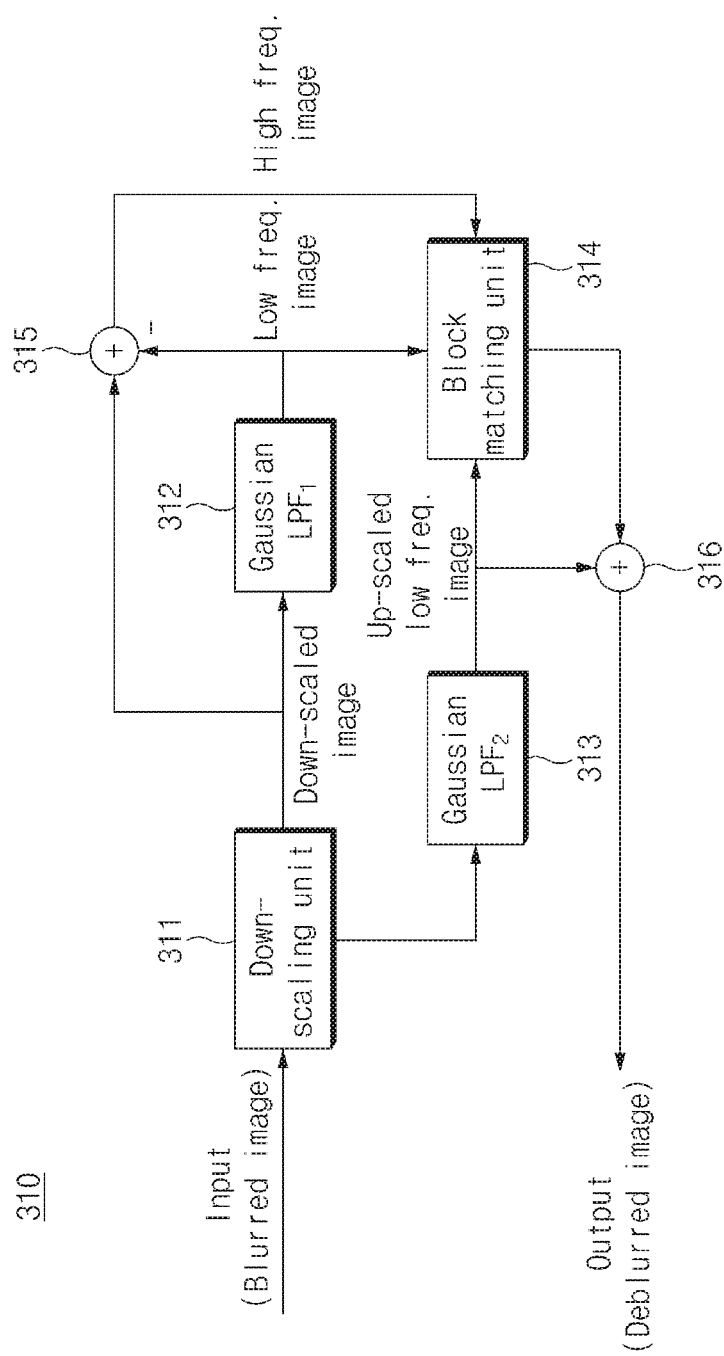
FIG. 5 is a block diagram of a deblurrer according to an exemplary embodiment in the present disclosure.

FIG. 5 is a block diagram of the deblurrer 310 according to an exemplary embodiment in the present disclosure.

Referring to FIG. 5, the deblurrer 310 according to the present exemplary embodiment includes a downscaling unit 311, a first Gaussian low-pass filter (LPF) 312, a second Gaussian LPF 313, a block matching unit 314, a first calculator 315, and a second calculator 316.

<Extraction of High Frequency Component>

In order to extract a high frequency component from an input wide-angle image blurred with a Gaussian kernel, first, the downscaling unit 311 generates a low resolution image LR downscaled using linear interpolation D with respect to an input wide-angle image I, as expressed by Equation 2. The downscaled low resolution image LR is a sharp image including a high frequency component. Next, the first Gaussian LPF 312, an LPF in a Gaussian form, processes the low resolution image LR to generate a low frequency component image $LR_{LF}$, and the first calculator 315 may subtract the low frequency component image $LR_{LF}$ from the low resolution image LR to generate a high frequency component image $LR_{HF}$. The split low frequency/high frequency component images $LR_{LF}$ and $LR_{HF}$ are input to the block matching unit 314.

$$LR = D(I)$$

$$LR_{LF} = LPF_1 * LR$$

$$LR_{HF} = LR - LR_{LF} \quad \text{[Equation 2]}$$

<Matching Process>

In order to synthesize a high frequency component suitable for the input wide-angle image, a process of matching the input wide-angle image I and the low resolution image LR is required beforehand. Band ranges of frequency components where the two images are present are different. Thus, regarding the input wide-angle image I, the second Gaussian LPF 313 performs upscaling (e.g., by the reciprocal of downscaling) and low-pass-filtering on the downscaled low resolution image LR to generate an upscaled low frequency component image $HR_{LF}$ (e.g., corresponding to the input wide-angle image) as expressed by Equation 3.

Thus, the block matching unit 314 may match the two corresponding image blocks $LR_{LF}$ and $HR_{LF}$ having the same frequency band. The matching process may be performed in units of predetermined blocks or patches.

$$HR_{LF} = LPF_2 * I \quad \text{[Equation 3]}$$

In each process of splitting the input wide-angle image and the low frequency of the low resolution image as mentioned above, Gaussian filters having different sigma values (e.g., a standard deviation for determining a width of a Gaussian graph or a size of a blur kernel) may be used. This is to allow the results of filtering the input wide-angle image having a component of a low frequency band and the low resolution image having a component of the entire band to have components of the same band, because low-pass-filtering is performed through spatial filtering. Also, since Gaussian filtering is applied to the input wide-angle image, an influence of noise and an artifact generated during an imaging process may be reduced to enhance matching performance.

<Synthesizing Process>

The block matching unit 314 may search for a low frequency component $LR_{LF}$ having low resolution and a high frequency component $LR_{HF}$ from the first calculator 315 corresponding thereto regarding blocks of the low frequency component image $HR_{LF}$ (e.g., corresponding to the input wide-angle image) currently upscaled through the matching process. A process of restoring the high frequency component to finally synthesize an image with improved sharpness is performed in units of patches, and the second calculator 316 may synthesize the current upscaled low frequency component image block $HR_{LF}$ (e.g., corresponding to the input wide-angle image) and the high frequency component image block $LR_{HF}$ from the block matching unit 314 corresponding thereto to output a deblurred image, as expressed by Equation 4. That is, a patch O(p) of the deblurred output image may be expressed as a composite value of the low frequency component patch $HR_{LF}(p)$ of the input wide-angle image and the high frequency component image patch $LR_{HF}(P)$ of the low resolution image matched thereto, as expressed by Equation 4.

$$O(p) = HR_{LF}(p) + LR_{HF}(p) \quad \text{[Equation 4]}$$

<3. Multi-Scale Scheme>

The method using self-similarity may obtain a sharper image as an input image is downscaled to have a smaller size, but since similarity thereof to the input image is lowered, degrading matching performance. On the other hand, if the image is not sufficiently downscaled and used, matching performance may be enhanced, but sharpness of the low resolution image is slightly low, making it difficult to ascertain an effect of improving sharpness of a final image.

In order to solve the problem, in the present disclosure, a deblurring process is performed in two stages. First, the deblurrer 310 deblurs a plurality of low resolution images having different resolutions obtained by multi-scaling (e.g., ½ magnification, ⅔ magnification, and the like) the input image through the operation illustrated in FIG. 5, and subsequently generates a sharp downscaled image of ⅔ magnification, or the like, through interpolation, or the like, from the deblurred images. Thereafter, the deblurrer 310 may finally generate a sharp deblurred image having resolution of the input image through interpolation, or the like, using the input image and the sharp downscaled image of ⅔ magnification, or the like.

<4. Deblurring by Region>

When the deblur scheme is applied to the entire input wide-angle image in the same manner, since a central portion of the image has sufficient sharpness and flat and texture regions are less affected by blur, an effect of deblurring is reduced in the flat and texture regions. Also, since the user may recognize a great improvement of sharpness in an edge portion, the deblurrer 310 may perform the deblurring process only in the edge component, while omitting the deblurring process in the flat and texture regions.

For example, in applying a Laplacian of Gaussian, a generally used edge detection method, an image may be upscaled to be doubled, or the like, to detect a sharper edge. The deblurrer 310 may discriminate an edge by giving a weight value such that an edge of an outer portion of an image may be more easily detected in a zero crossing process. Thereafter, the deblurrer 310 may remove an outlier, perform hole-filling, and upscale the image to be doubled to detect a final edge region, and perform the deblurring process only on a patch as the edge region.

The SR unit 320 performs SR processing on the wide-angle image output from the deblurrer 310 to generate an artifact-free, upscaled sharp image with high resolution in operation S321. During the SR process, in upscaling the image, a filter appropriate for the corresponding image is applied according to a form of a pattern based on the SR scheme using an active local binary pattern (LBP)-based classifier to obtain an upscaled transformed image with sharp image quality. Since the image is upscaled using SR, a space between integer-position pixels used in interpolation may be reduced in view transformation, thus enhancing performance in the view transformation process.

The SR process performed by the SR unit 320 includes a learning process and a synthesizing process.

<1. Learning Process>

During the learning process, a pair of a low resolution image and a high resolution image are input and patterns of the respective images are classified through an LBP-based classifier and coded, and filter factors regarding the corresponding patterns are calculated and stored in a predetermined dictionary database (DB).

<2. Synthesizing Process>

During the synthesizing process, a scheme of retrieving a filter factor from the dictionary DB using an addressing scheme is used.

Regarding an input of a low resolution image, a corresponding pattern is coded using the LBP-based classifier used in the learning process, and a filter factor is retrieved from the dictionary DB by using the code as an address value of a filter factor corresponding to the pattern to call a filter for SR. Here, a filter corresponding to the pattern is retrieved without a feature matching process, thereby the processing may be performed at a high speed. Finally, with respect to the input low resolution image patch, the SR unit 320 may output an upscaled high resolution patch with sharp image quality restored through filtering using a two-dimensional finite impulse response (2D-FIR) filter for SR.

In order to obtain a narrow-angle image corresponding to the wide-angle image upscaled by the SR unit 320, the view transformer 330 estimates pixel values placed in a non-integer coordinate position using adjacent pixel values present in integer positions of the wide-angle image referred to from the LUT on the basis of the LUT-based view transformation interpolation in operation S331.

In order to obtain a pixel value of the narrow-angle image 120, a pixel value positioned in coordinates having a non-integer value is estimated by applying bilinear interpolation using adjacent pixel values positioned in integer positions in an LUT. Since a filter including four taps is applied in the bilinear interpolation, a result with relatively low performance is obtained in transforming a wide-angle image value at the non-integer position.

Apart from the use of the bilinear interpolation, in the present disclosure, the view transformer 330 may calculate a pixel value at each coordinate x using a Lanczos filter based on an ideal sinc function L(x) as shown in Equation 5. The use of the Lanczos filter improves interpolation performance. In order to estimate pixel values present in non-integer coordinate positions using adjacent pixel values existing in integer positions referred to from the LUT, a coefficient "a" in Equation 5 is selected as an appropriate value (e.g., 3) and a predetermined number of taps (e.g., a total of 36 taps in width and length) is selected to use a weight value more precise than an existing technique to utilize a larger number of pixel values of the wide-angle image to obtain an improved result, while transforming the image.

$$L(x) = \begin{cases} \dfrac{a\sin(\pi x)\sin(\pi x/a)}{\pi^2 x^2}, & \text{if } 0 < |x| < a \\ 0 & \text{otherwuse} \end{cases}$$ [Equation 5]

Figure 6A:
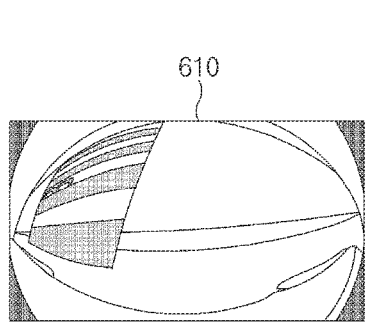
FIGS. 6A-6C are views illustrating a comparison between an image processing result according to an exemplary embodiment in the present disclosure and an image processing result of an existing technique with respect to an input wide-angle image.
Figure 6B:
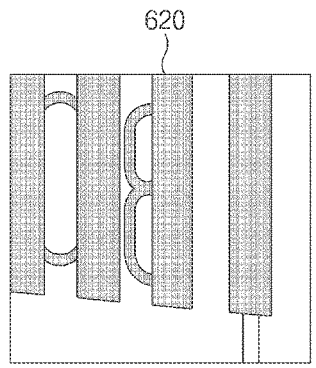
Figure 6C:
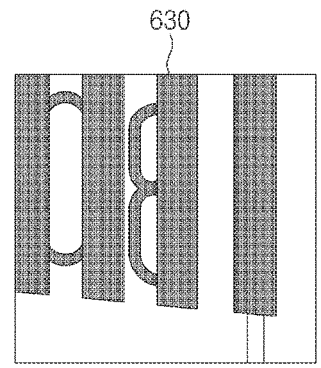

FIGS. 6A-6C are views illustrating a comparison between an image processing result 630 according to an exemplary embodiment in the present disclosure and an image processing result 620 of an existing technique with respect to an input wide-angle image 610.

As illustrated in FIGS. 6A-6C, it can be seen that, compared with the image processing result 620 shown in FIG. 6B, where the existing technique based on a view transformation scheme uses a bilinear filter, image quality of an AVM top-view image is improved to be sharper in the image processing result 630 of the present disclosure shown in FIG. 6C, which is based on the application of deblur and SR preprocessing and the view transformation scheme using the Lanczos filter.

Figure 7:
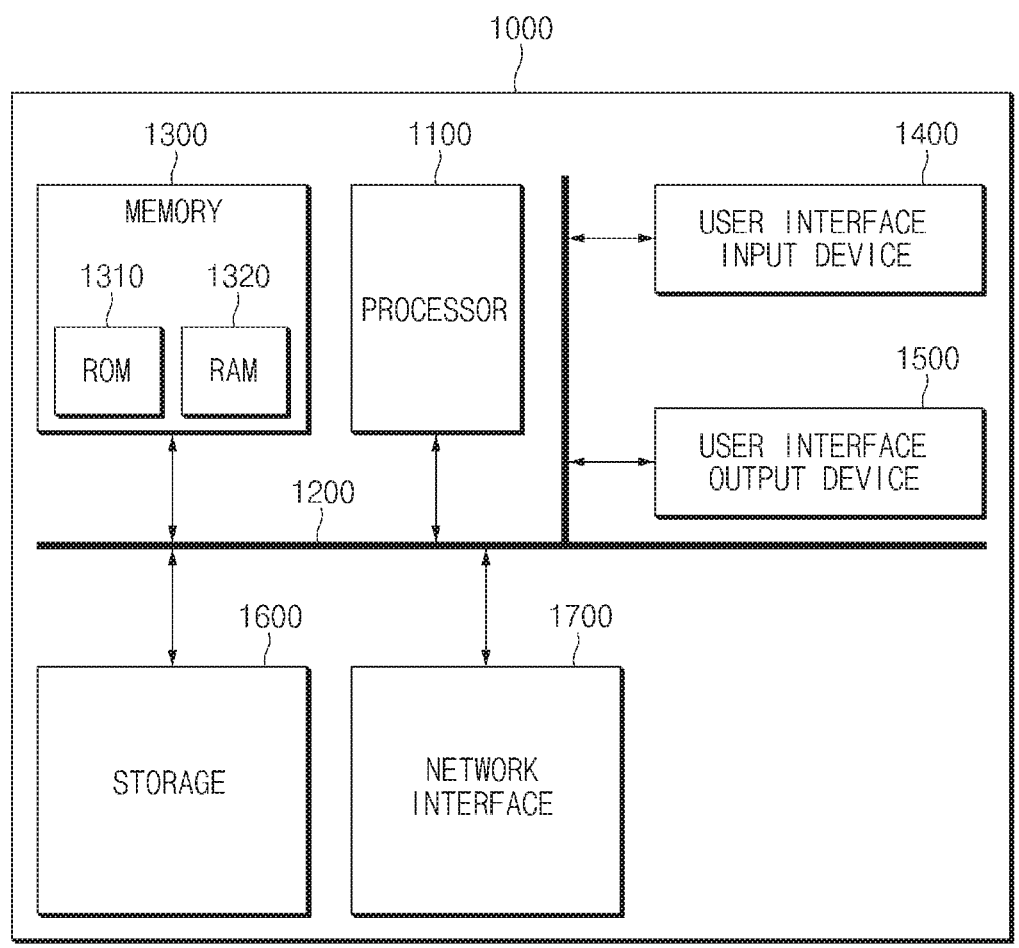
FIG. 7 is a view illustrating an example of a method for implementing an image processing apparatus according to an exemplary embodiment of the present disclosure.

FIG. 7 is a view illustrating an exemplary embodiment of an apparatus for implementing an image processing apparatus 100. The image processing apparatus 100 may include hardware, software, or a combination thereof. For example, the image processing apparatus 100 may be implemented as a computing system 1000 illustrated in FIG. 7.

The computing system 1000 may include at least one processor 1100, a memory 1300, a user interface input device 1400, a user interface output device 1500, a storage 1600, and a network interface 1700 connected through a bus 1200. The processor 1100 may be a semiconductor device executing processing on command languages stored in a central processing unit (CPU) or the memory 1300 and/or storage 1600. The memory 1300 and the storage 1600 may include various types of volatile or nonvolatile storage mediums. For example, the memory 1300 may include a read only memory (ROM) 1310 and a random access memory (RAM) 1320.

Thus, the steps of the method or algorithm described above in relation to the exemplary embodiments in the present disclosure may be directly implemented by hardware, a software module, or a combination thereof executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a detachable disk, or a CD-ROM. An exemplary storage medium is coupled to the processor 1100, and the processor 1100 may read information from the storage medium and write information into the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside as separate components in a user terminal.

As described above, in the image processing apparatus 100 according to an exemplary embodiment in the present disclosure, a blur kernel of an outer portion of a wide-angle image obtained from a wide-angle camera installed in a vehicle is estimated through blur image modeling, and high frequency information is obtained from a downscaled input image by employing deblur using self-similarity and synthesized with the input image to output a wide-angle image with improved sharpness. Also, by upscaling an image using super-resolution (SR), a space between pixels used in interpolation in the case of view transformation may be narrowed to enhance performance in the view transformation process. Thus, a magnified image with sharpness improved through preprocessing of deblur and the SR process is input in a view transformation process and the image quality of an AVM top-view image is improved, whereby a driver's object recognition ability is enhanced to promote convenience and safety.

According to the image processing apparatus and method of the present disclosure, when an image obtained by a wide-angle camera installed in a vehicle is transformed into an AVM top-view image, deblur and SR schemes are used in preprocessing the image to improve image quality of the AVM top-view image, whereby a driver's object recognition ability is enhanced to promote convenience and safety.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An image processing apparatus for transforming a wide-angle image into a narrow-angle image, the image processing apparatus comprising:
a memory storing an application program; and
a processor configured to execute the application program stored in the memory, wherein execution of the application program causes the processor to:
perform deblurring on the wide-angle image to generate a deblurred image, and estimating whether an outer portion of the input wide-angle image has a Gaussian blur kernel based on blur image modeling;
perform super-resolution (SR) processing on the deblurred image to generate an upscaled transformed image; and
perform view transformation to obtain the narrow-angle image based on the wide-angle image and the upscaled transformed image,
wherein the processor performs the deblurring by:
performing a multi-scaling operation on the input wide-angle image to perform deblurring on a plurality of low-resolution images having different resolutions,
generating a downscaled low-resolution image by interpolating the plurality of deblurred images,
obtaining high frequency information from the downscaled low resolution image, and
synthesizing the obtained high frequency information with the input wide-angle image.

2. The image processing apparatus according to claim 1, wherein the upscaled transformed image has sharpness enhanced through preprocessing, and the preprocessing includes the deblurring of the wide-angle image and the SR processing of the deblurred image, and the upscaled transformed image is used as an input to the view transformation to enhance performance of the view transformation to obtain the narrow-angle image.

3. The image processing apparatus according to claim 1, wherein the processor performs deblurring by using self-similarity to downscale the wide-angle image, by searching for high frequency information, and by synthesizing the high frequency information with the wide-angle image to thereby output the deblurred image with improved sharpness.

4. The image processing apparatus according to claim 1, wherein the processor performs SR processing by applying a filter appropriate for a corresponding image according to an image pattern based on an SR scheme using a local binary pattern (LBP)-based classifier.

5. The image processing apparatus according to claim 1, wherein the processor performs view transformation by estimating pixel values present at non-integer coordinate positions using adjacent pixel values present in integer positions of a wide-angle image referred to from a look-up table (LUT) on the basis of an LUT-based view transformation interpolation scheme.

6. The image processing apparatus according to claim 1, wherein the processor performs deblurring by:
generating the downscaled low resolution image using linear interpolation with respect to the input wide-angle image;
applying a first Gaussian low pass filter (LPF) to the downscaled low resolution image;
performing a second Gaussian LPF upscaling and low-pass filtering to the downscaled low resolution image;
subtracting an output from the first Gaussian LPF from the downscaled low resolution image to generate a high frequency (HF) component image;
searching and outputting a high frequency component of the output of the subtracting that corresponds to an output image from the second Gaussian LPF using matching of an output image from the first Gaussian LPF and the output image from the second Gaussian LPF; and synthesizing the output image from the second Gaussian LPF and the high frequency component from the block matching unit to output a deblurred image.

7. The image processing apparatus according to claim 1, wherein the processor deblurs the plurality of low resolution images obtained by the multi-scaling of the wide-angle image and obtains a first sharp downscaled image through interpolation on the deblurred images, and generates the deblurred image through interpolation by using the wide-angle image and the first downscaled image.

8. The image processing apparatus according to claim 1, wherein the processor deblurs an edge portion excluding a flat region and a texture region of the wide-angle image.

9. The image processing apparatus according to claim 1, wherein the processor performing SR processing obtains the upscaled transformed image using a two-dimensional finite impulse response (2D-FIR) filter.

10. The image processing apparatus according to claim 1, wherein the processor performs view transformation using a Lanczos filter.

11. An image processing method for transforming a wide-angle image into a narrow-angle image, the method comprising:

deblurring the wide-angle image to generate a deblurred image and estimating whether an outer portion of the input wide-angle image has a Gaussian blur kernel based on blur image modeling;

performing super-resolution (SR) processing on the deblurred image to generate an upscaled transformed image; and performing view transformation to obtain the narrow-angle image based on the wide-angle image and the upscaled transformed image, wherein the performing the deblurring includes:

performing a multi-scaling operation on the input wide-angle image to perform deblurrering on a plurality of low-resolution images having different resolutions, generating a downscaled low-resolution image by interpolating the plurality of deblurred images, obtaining high frequency information from the downscaled low resolution image, and synthesizing the obtained high frequency information with the input wide-angle image.

12. The method according to claim 11, wherein the upscaled transformed image has sharpness enhanced through preprocessing, and the preprocessing includes the deblurring of the wide-angle image and the SR processing of the deblurred image, and the upscaled transformed image is used as an input to the view transformation to enhance performance of the view transformation to obtain the narrow-angle image.

13. The method according to claim 11, wherein, in the deblurring, a deblur scheme using self-similarity is performed to downscale the wide-angle image and high frequency information is searched and synthesized with the input wide-angle image to thereby output the unblurred image.

14. The method according to claim 11, wherein, in the generating the upscaled transformed image, the upscaled transformed image is obtained by applying a filter appropriate for a corresponding image according to an image pattern based on an SR scheme using an active local binary pattern (LBP)-based classifier.

15. The method according to claim 11, wherein, in the performing the view transformation, pixel values present at non-integer coordinate positions are estimated using adjacent pixel values present in integer positions of a wide-angle image referred to from a look-up table (LUT) on the basis of an LUT-based view transformation interpolation scheme.

16. The method according to claim 11, wherein the deblurring includes:

generating the downscaled low resolution image using linear interpolation with respect to the wide-angle image;

low-pass-filtering, by a first Gaussian low-pass filter (LPF), the downscaled low resolution image;

performing upscaling and low-pass filtering, by a second Gaussian LPF, on the downscaled low resolution image;

subtracting, by a first calculator, an output from the first Gaussian LPF from the downscaled low resolution image;

searching and outputting, by a block matching unit, a high frequency component of the first calculator corresponding to an output image from the second Gaussian LPF using matching of an output image from the first Gaussian LPF and the output image from the second Gaussian LPF; and synthesizing the output image from the second Gaussian LPF and the high frequency component from the block matching unit to output the deblurred image.

17. The method according to claim 11, wherein, in the deblurring, the plurality of low resolution images obtained by multi-scaling the input wide-angle image are deblurred and a first sharp downscaled image is obtained through interpolation on the deblurred images, and the deblurred image is generated through interpolation using the wide-angle image and the first downscaled image.

18. The method according to claim 11, wherein, in the deblurring, an edge portion, excluding a flat region and a texture region of the wide-angle image, is deblurred.

19. The method according to claim 11, wherein, in the generating the upscaled transformed image, the upscaled transformed image is obtained using a two-dimensional finite impulse response (2D-FIR) filter.

20. The method according to claim 11, wherein, in the performing the view transformation, the view transformation is performed using a Lanczos filter.

* * * * *